(12) United States Patent
Vallius et al.

(10) Patent No.: US 10,281,726 B2
(45) Date of Patent: May 7, 2019

(54) REFRACTIVE-DIFFRACTIVE DISPLAY SYSTEM WITH WIDE FIELD OF VIEW

(71) Applicant: Microsoft Technology Licensing, LLC, Redmond, WA (US)

(72) Inventors: Tuomas Heikki Sakari Vallius, Redmond, WA (US); Pasi Petteri Pietilä, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/479,227

(22) Filed: Apr. 4, 2017

(65) Prior Publication Data

US 2018/0284439 A1    Oct. 4, 2018

(51) Int. Cl.
| G02B 5/18 | (2006.01) |
| G02B 27/01 | (2006.01) |
| F21V 8/00 | (2006.01) |

(52) U.S. Cl.
CPC ....... *G02B 27/0172* (2013.01); *G02B 5/1842* (2013.01); *G02B 6/0033* (2013.01); *G02B 2027/0125* (2013.01)

(58) Field of Classification Search
CPC ..... G02B 6/0033; G02B 6/0035; G02B 5/203
USPC ............. 359/13, 15, 34; 385/10, 37, 146
See application file for complete search history.

(56) References Cited

U.S. PATENT DOCUMENTS

| 4,981,332 | A | 1/1991 | Smith |
| 5,243,448 | A | 9/1993 | Banbury |
| 6,765,730 | B2 | 7/2004 | Takahashi |
| 7,295,377 | B2 | 11/2007 | Edelmann |
| 8,830,588 | B1 | 9/2014 | Brown et al. |
| 2003/0210911 | A1 | 11/2003 | Takahashi et al. |
| 2006/0126181 | A1 | 6/2006 | Levola |
| 2007/0188837 | A1* | 8/2007 | Shimizu ................ G02B 5/203 359/13 |
| 2009/0097122 | A1 | 4/2009 | Niv |
| 2009/0128911 | A1 | 5/2009 | Itzkovitch et al. |
| 2009/0273840 | A1 | 11/2009 | Mclaughlin |
| 2009/0303599 | A1 | 12/2009 | Levola |
| 2010/0231693 | A1* | 9/2010 | Levola ............... G02B 27/0081 348/51 |
| 2014/0140653 | A1* | 5/2014 | Brown ................ G02B 6/0033 385/10 |
| 2014/0204438 | A1 | 7/2014 | Yamada et al. |
| 2014/0240834 | A1 | 8/2014 | Mason |
| 2015/0086163 | A1* | 3/2015 | Valera ................. G02B 6/0035 385/37 |
| 2015/0177497 | A1 | 6/2015 | Travis |

OTHER PUBLICATIONS

Huxford, Roger B, "Wide FOV Head Mounted Display using Hybrid Optics", In Proceedings of SPIE, vol. 5249, Feb. 18, 2004, pp. 230-237.

* cited by examiner

*Primary Examiner* — Audrey Y Chang
(74) *Attorney, Agent, or Firm* — Arent Fox LLP

(57) ABSTRACT

A multi-chromatic optical waveguide for a near-eye display (NED) device includes reflective/refractive structures and periodic grating structures. Image incoupling and outcoupling can be done by reflective mirrors/facets, and image expansion can done by one or more even order expansion gratings. Wider field of view can be by achieved by splitting the field-of-view into multiple portions that propagate in different directions within the waveguide and then recombining those portions in the outcoupling region of the waveguide.

15 Claims, 6 Drawing Sheets

US 10,281,726 B2

REFRACTIVE-DIFFRACTIVE DISPLAY SYSTEM WITH WIDE FIELD OF VIEW

BACKGROUND

Near-eye display (NED) systems such as head-mounted display (HMD) devices can be used for virtual reality (VR) and/or augmented reality (AR) applications. An HMD device designed for AR typically includes two major subsystems: a light engine that creates a virtual image, and a transparent combiner that conveys the virtual image into the eyes of the user while at the same time allowing the user to see the real world around him. Significant design considerations for an AR-capable HMD device include the size of the field of view as well as the size, weight and complexity of the HMD device. These considerations can be affected by (among other things) the optical components within the combiner.

SUMMARY

The technique introduced here includes a waveguide comprising a light transmissive substrate, optical input and output ports in the substrate, and a diffraction grating in the substrate. The substrate has one or more optical input/output surfaces The optical input port includes a reflector to receive multi-chromatic light from outside the waveguide and to change a propagation direction of the light so as to cause the light to propagate through the substrate. The optical output port also includes a second reflector to output at least a portion of the light from the waveguide. The diffraction grating has an even-order diffraction property and is configured to convey at least a portion of the light from the optical input port to the optical output port while changing a propagation direction of the conveyed portion of the light within a plane parallel to the input/output surface(s).

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
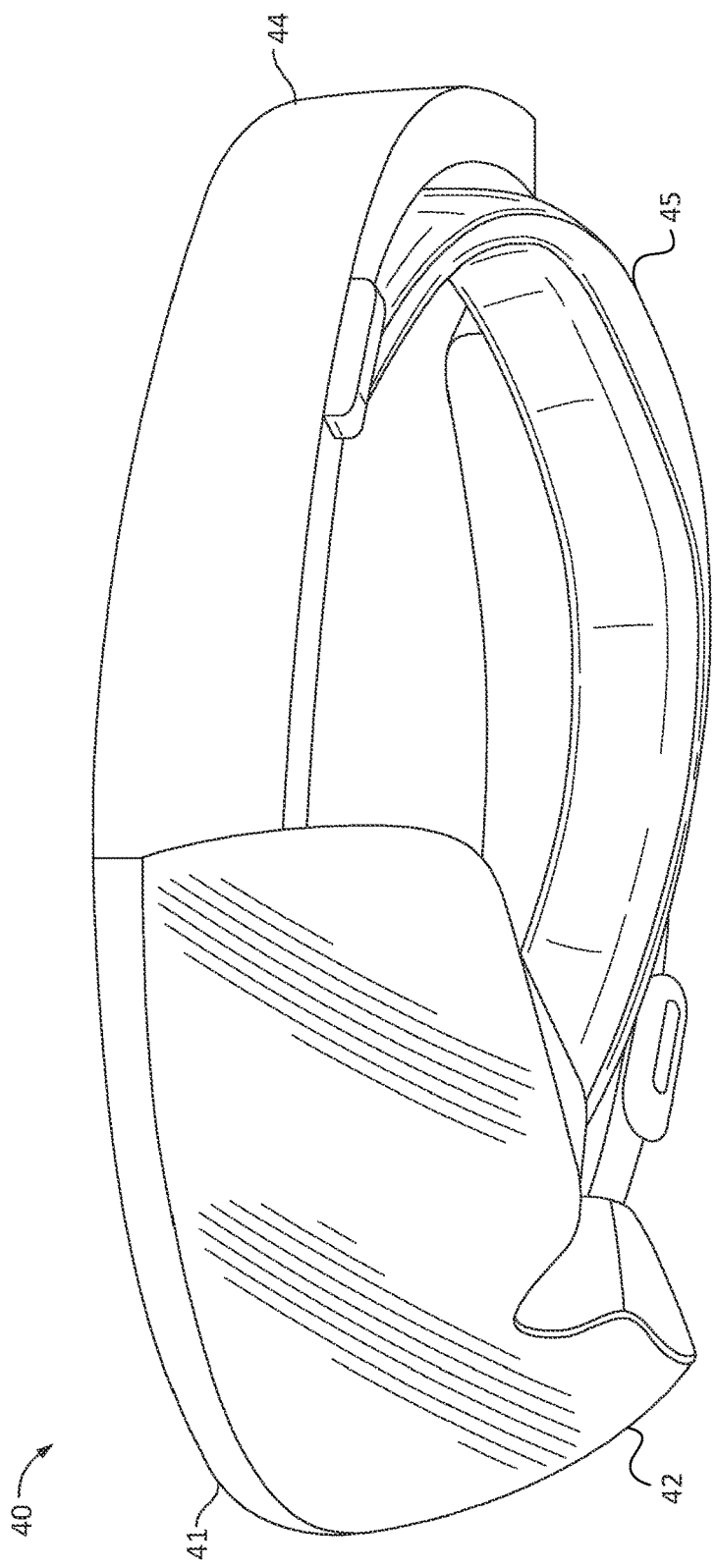
FIG. 1 shows an example of an HMD device that may incorporate the technique introduced herein.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

As noted above, an HMD device designed for AR typically includes two major subsystems: a light engine that creates a virtual image, and a transparent combiner that conveys the virtual image into the eyes of the user while at the same time allowing the user to see the real world around him. The thinnest type of combiner is an optical waveguide that replicates and expands the incoupled pupil over the entire eyebox. There are two main types of optical waveguide: geometric and diffractive. Geometrical optical waveguides use reflection and/or refraction for the incoupling/outcoupling, whereas diffractive optical waveguides use diffraction for the incoupling/outcoupling. In geometrical optical waveguides, because light is coupled into the waveguide using reflection or refraction, all wavelengths/colors can be coupled into the waveguide, since the propagation angles are close to each other (only material dispersion causes small differences in the angles between the colors).

A significant problem encountered with refractive or reflective waveguides, is the direction of pupil expansion. The image is incoupled to the waveguide to propagate in one direction and then little by little is coupled out, thus expanding the pupil in one dimension (e.g., horizontally or vertically from the user's viewpoint). Therefore, the other dimension of the pupil is small, and if one wants a large field of view and large pupil in two dimensions to obtain a large eyebox, one needs to create a large pupil in the light engine in one direction. Yet the size of the light engine tends to increase drastically when designed to increase the pupil size or the field of view. Hence, feasible expansion of the pupil in two directions with geometrical optics waveguides is problematic.

Diffractive waveguides, on the other hand, use diffractive gratings to couple light into the waveguide and out of the waveguide. They can also contain an intermediate element that turns light so that we can get a pupil that is expanded in two directions. Since the coupling is done by a diffractive grating, every wavelength propagates in a different direction, and therefore, the waveguiding requirement cannot be met by all colors simultaneously unless the field of view is very small (for example, 10 degrees). One possible solution to that problem is to provide a separate waveguide for each color components of the light engine, e.g., in an RGB display, separate waveguides for each of the red, green and blue color components. But that approach introduces tight assembly tolerances, such that manufacturing is challenging. The parallelism difference of the waveguides should be on the order of an arcsecond, the bow values should be only some microns, and cross-coupling between different colors is difficult to manage. Therefore, a three-waveguide assembly tends to compromise optical resolution in addition to causing increased mass and size of the device.

One way to combine the advantages of geometrical and diffractive waveguides would be to provide incoupling/outcoupling by using reflection/refraction and provide pupil expansion by using a diffractive grating (turning grating). However, two problems arise with such an approach. First, gratings are dispersive, so the dispersion introduced by the gratings needs to be compensated for. This can be done by gratings whose periods are matched with an accuracy of 0.01%. Otherwise, the different wavelengths of multi-chromatic light will propagate in different directions, and the optical resolution will be very low. Alternatively, one could use an extremely narrow-bandwidth frequency-doubled laser, but such lasers do not exist in small packages at present. Another problem is the small functional wavelength bandwidth of the turning grating with large fields of view: one part of the field of view would be coupled out of the waveguide, since a turning grating would supports a field of view up to only about 40 degrees.

Introduced here, therefore, is a solution to these problems. Specifically, the solution introduced here combines a reflective (geometric) optical waveguide with periodic grating structures. The incoupling and outcoupling is done by reflective mirrors/facets, and the image expansion is done by one or more expansion gratings. This approach allows one to achieve a wide field of view (e.g., at least 90 degrees) and substantial efficiency improvement (e.g., at least 10×) with a single waveguide what works with all colors. To solve the grating dispersion problem, grating dispersion can be compensated by using a turning grating that diffracts the incoupled beam an even order of times, thus compensating the dispersion away with the second diffraction. If one uses a waveguide in which the pupil is diffracted by the expansion grating an even number of times, the grating dispersion is automatically compensated. Additionally, the rotational alignment tolerance of an even order grating is on the order of one degree, whereas the tolerance with a conventional odd order grating is only about 0.001 degrees. The narrow propagation window of the expansion grating can be solved by splitting the field-of-view into portions that propagate in different directions within the waveguide and then recombining those portions in the outcoupling region of the waveguide. For example, the left portion of the field of view can propagate from the incoupling region to a left expansion grating while the right portion of the field of view can propagate from the incoupling region to a right expansion grating. The left and right expansion gratings can overlap in the middle so that the center portion of the field of view propagates both left and right, thus filling the whole eyebox.

Before discussing this solution further, it is useful to consider an example of an HMD device in which the solution can be implemented. FIG. 1 shows such an example. To facilitate description, it is henceforth assumed that the HMD device 40 is designed for AR visualization.

In the illustrated embodiment, the HMD device 40 includes a chassis 41, a transparent protective visor 42 mounted to the chassis 41, and left and right side arms 44 mounted to the chassis 41. The visor 42 forms a protective enclosure for various display elements (not shown) that are discussed below.

The chassis 41 is the mounting structure for the visor 42 and side arms 44, as well as for various sensors and other components (not shown) that are not germane to this description. A display assembly (not shown) that can generate images for AR visualization is also mounted to the chassis 41 and enclosed within the protective visor 42. The visor assembly 42 and/or chassis 41 may also house electronics (not shown) to control the functionality of the display assembly and perform other functions of the HMD device 40. The HMD device 40 further includes an adjustable headband 45 attached to the chassis 41, by which the HMD device 40 can be worn on a user's head.

Figure 2A:
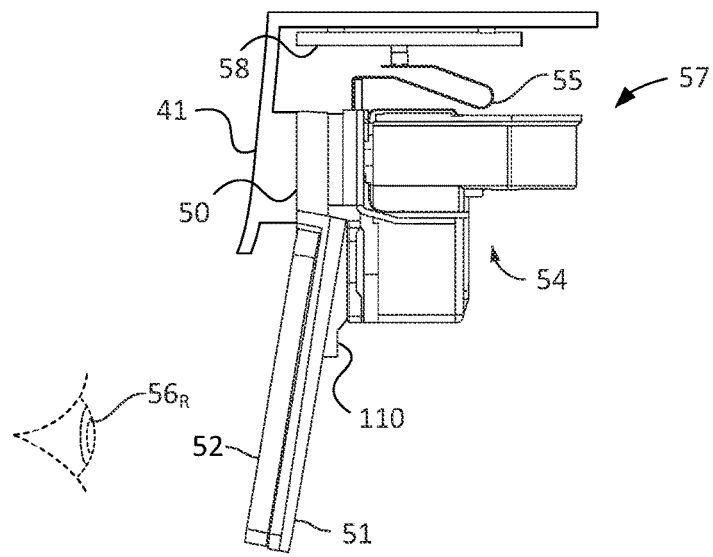
FIG. 2A shows a right side view of display components that may be contained within the HMD device of FIG. 1.
Figure 2B:
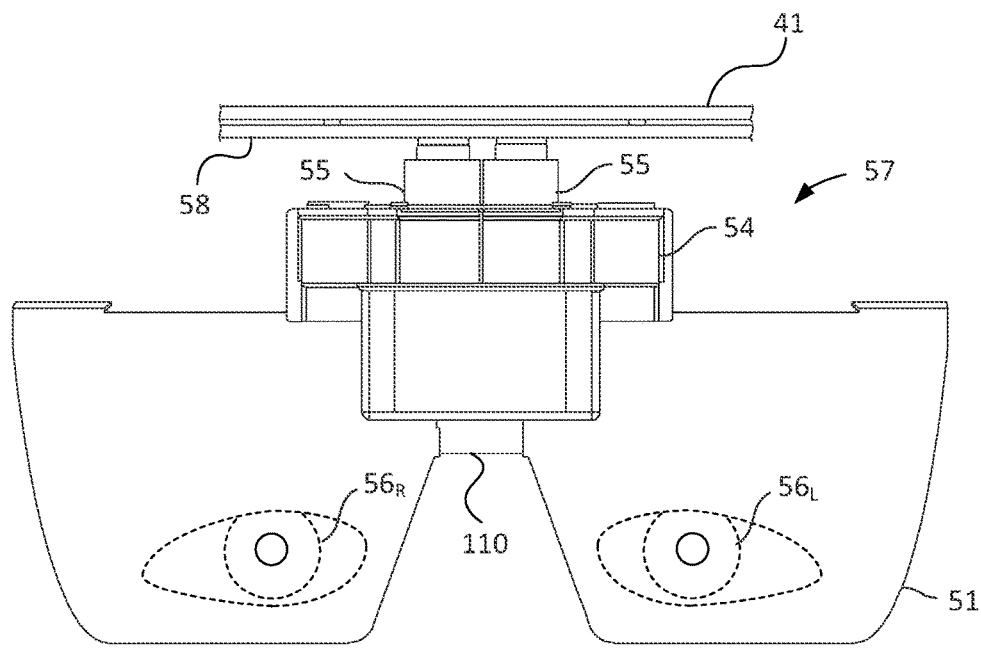
FIG. 2B shows a front view of display components that may be contained within the HMD device of FIG. 1.

FIGS. 2A and 2B show, in accordance with certain embodiments, right side and front orthogonal views, respectively, of display components that may be contained within the visor 42 of the HMD device 40. During operation of the HMD device 40, the display components are positioned relative to the user's left eye $56_L$ and right eye $56_R$ as shown. The display components are mounted to the interior surface of the chassis 41. The chassis 41 is shown in cross-section in FIG. 2A.

The display components are designed to overlay three-dimensional (stereoscopic) images on the user's view of his real-world environment, e.g., by projecting light into the user's eyes. Accordingly, the display components include a display module 54 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 54 may be connected via a flexible circuit connector 55 to a printed circuit board 58 that has image generation/control electronics (not shown) mounted on it.

The display components further include a transparent waveguide carrier 51 to which the display module 54 is mounted, and multiple transparent waveguides 52 stacked on the user's side of the waveguide carrier 51, for each of the left eye and right eye of the user. The waveguide carrier 51 has a central nose bridge portion 110, from which its left and right waveguide mounting surfaces extend. One or more waveguides 52 are stacked on each of the left and right waveguide mounting surfaces of the waveguide carrier 51, to project light emitted from the display module and representing images into the left eye $56_L$ and right eye $56_R$, respectively, of the user. One advantage of the solution introduced here is that for all colors, a single waveguide 52 can be used for each of the left eye $56_L$ and the right eye $56_R$, instead of three waveguides for each eye (e.g., one each for red, green and blue). The display assembly 57 can be mounted to the chassis 41 through a center tab 50 located at the top of the waveguide carrier 51 over the central nose bridge section 110.

Figure 3:
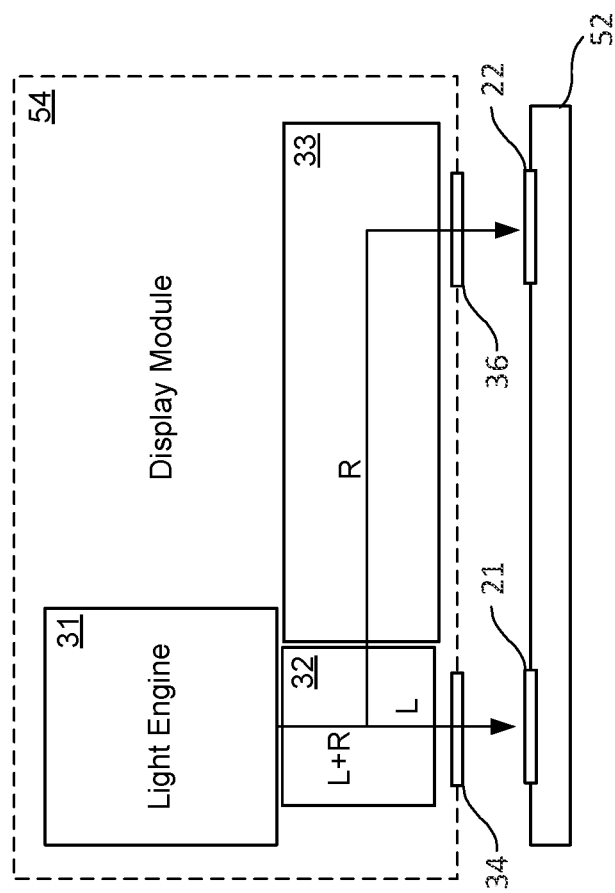
FIG. 3 schematically shows an example of relevant components of the display module for one eye of the user.

FIG. 3 schematically shows an example of relevant components of the display module 54 for one eye of the user. The view in FIG. 3 is from directly above the display module 54, looking down.

In the example of FIG. 3, the display module 54 includes a light engine 31, an optical switch 32 and a pupil relay 33. Though not shown, the display module 54 may also include similar or identical components for the other eye of the user. In some embodiments, the light engine 31 includes one or more light sources (not shown), such as one or more colored LEDs. For example, the light engine 31 can include red, green and blue LEDs to produce the red, green and blue color components, respectively, of the image. Additionally, the light engine 31 includes at least one microdisplay imager (not shown), such as an LCOS imager, LCD or DMD; and may further include one or more lenses, beam splitters, waveguides, and/or other optical components (not shown).

The optical switch 32 controls the propagation direction of the light output by the light engine 31, representing each particular portion of the image, to one of two different optical paths. In the illustrated embodiment, the first path is for the left half of the image and leads to an output port 34 of the display module 54 that is coupled to one corresponding input port 21 of the waveguide 52. The other optical path is for the right portion of the image and includes a pupil relay 33, which propagates that portion of the image to a second output port 36 of the display module 54, which is optically coupled to a second corresponding input port 22 of the waveguide 20.

The optical switch 32 selectively controls the propagation direction of light from the light engine 31 based on a switching criterion, such as polarization. For example, one half of the image may have s-polarization while the other half of image has p-polarization, where the optical switch 32 conveys s-polarized light along one optical path and conveys p-polarized light along the other optical path. The switch 32 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths.

The pupil relay 33 is optional but enables larger distances between the input ports 21, 22 on the waveguide 20. The pupil relay 33 may be constructed using any known or convenient method and materials for transferring an image pupil from one location to another. For example, the pupil relay 33 may be constructed from a sequence of paraxial lenses that focus the pupil to an intermediate image and then collimate it, followed by a mirror to redirect the light into the corresponding input port of the waveguide.

Figure 4:
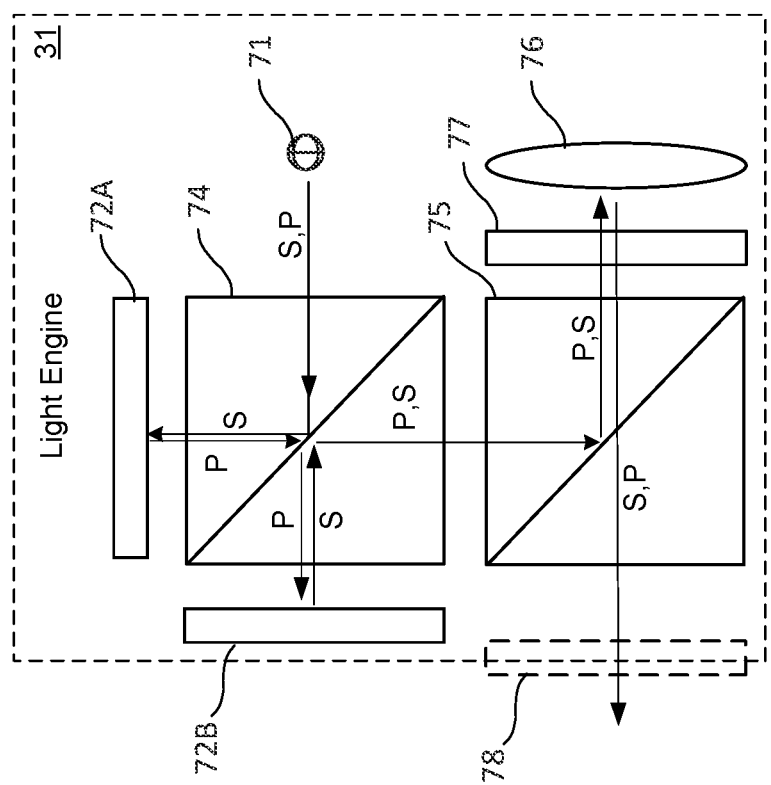
FIG. 4 schematically illustrates an example of relevant components of the light engine of FIG. 6.

FIG. 4 schematically illustrates an example of certain relevant components of the light engine 31 of FIG. 3, according to certain embodiments. The view in FIG. 4 is from the right side of the display module 54. Note that some embodiments may include other active and/or passive components, not shown. The light engine 31 in the illustrated embodiment includes at least one light source 71, such as a color LED. Although only one light source 71 is shown in FIG. 4, in practice there may be multiple light sources provided for each eye of the user, e.g., one for each color component of whatever color model is being employed (e.g., red, green and blue). The same or a similar configuration as shown in FIG. 4 can be used to combine light from such multiple light sources.

The light engine 31 further includes multiple imagers (e.g., LCOS microdisplays) 72A and 72B that generate separate portions of an image intended for display to a particular eye of the user. The two imagers 72A, 72B can be identical in size, functionality, etc. A retarder (e.g., quarter-wave plate) can be placed before the waveguide at one of the waveguide inputs to have optimum polarization entering the waveguide.

Additionally, the light engine 31 includes a combination of PBSs 74, 75, one or more reflective lenses 76 and one or more quarter-wave plates 77, that generates the separate portions of the image and propagates them simultaneously through the output port 78 of the light engine 31. More specifically, a first PBS 74 reflects s-polarized light from the light source 71 upward to a first microdisplay imager 72A, which generates one portion of the image. The PBS 74 also causes p-polarized light from the light source 71 to be propagated straight through to the other microdisplay imager 72B, which produces a second portion of the image. Both portions of the image (separately constituting s-polarized and p-polarized light) then propagate downward through the PBS 74 to a second PBS 75, which directs them to birdbath-shaped reflective lenses 76 via quarter-wave plates (retarders) 77. The image portions are then reflected back by the reflective lenses 76 through the quarter-wave plates 77 and then through the PBS 75. From there, the image portions are output through the output port 78 of the light engine 31 and provided to additional optics in the display module 54, as shown by the example in FIG. 3.

As mentioned above, the solution introduced here includes a multi-chromatic waveguide that includes reflective/refractive (geometric) optical structures with periodic diffractive grating structures. An example of such a waveguide 10 is shown schematically in FIG. 5. The waveguide 10 can be used as waveguide 52 in FIGS. 2A and 3. The incoupling to and outcoupling from the waveguide 10 is accomplished by reflective mirrors/facets in incoupling and outcoupling regions 11 and 13, respectively. Incoupling region 11 receives input light from a light engine, such as light engine 31 in FIGS. 3 and 4. Outcoupled light from outcoupling region 13 propagates to the user's eye. Image expansion is done by one or more diffractive expansion gratings 12. The arrows indicate the expansion of the pupil and the turning of the light propagation direction done by expansion grating 12. This approach allows one to achieve a wide field of view (e.g., at least 90 degrees) and substantial efficiency improvement (e.g., at least 10×) with a single waveguide what works with all colors. The expansion grating 12 is an even order expansion grating, which automatically compensates for the grating dispersion. Also the rotational alignment tolerance of the even order grating is on the order of 1 degree whereas the tolerance with the conventional odd order grating is about 0.001 deg.

Figure 6:
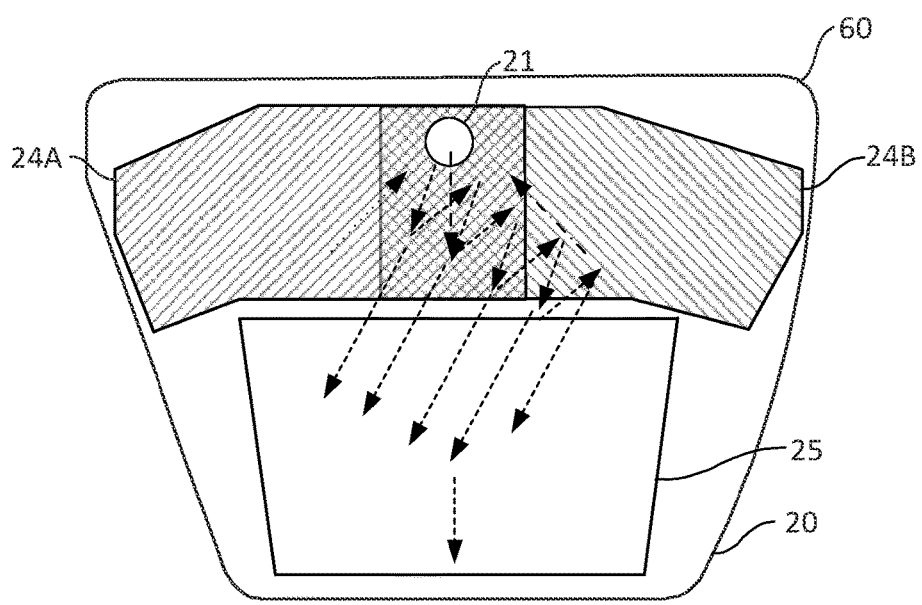
FIG. 6 shows an example of a multi-chromatic waveguide that includes reflective/refractive optical structures with multiple periodic diffractive grating structures to provide a wider field of view.

The narrow propagation window of the expansion grating can be solved by splitting the field of view into parts that propagate into different directions and are then recombined in the outcoupling region. An example of this approach is show in FIG. 6. In FIG. 6, the left portion (half or more) of the field of view propagates from the reflective/refractive incoupling region 21 to the left expansion grating 24A, while the right portion (half or more) of the field of view propagates from the reflective/refractive incoupling region 21 to the right expansion grating 24B. As shown, the left and right expansion gratings 24A and 24B, respectively, can overlap (from the user's viewpoint) in the middle of the field of view, so that the middle of the field of view propagates both left and right, thus filling the entire eyebox. The image is outcoupled from the waveguide 60 via reflective/refractive outcoupling region 25.

Figure 5:
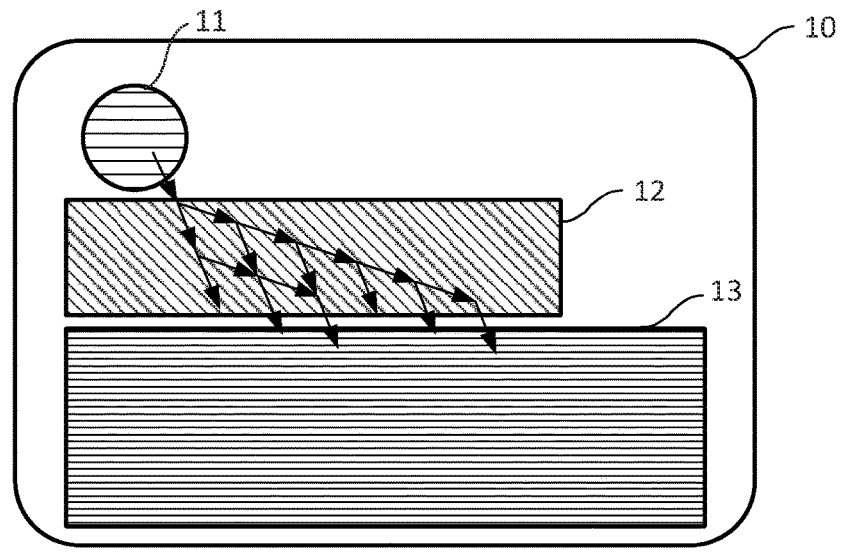
FIG. 5 schematically shows a multi-chromatic waveguide that includes reflective/refractive optical structures with periodic diffractive grating structures.
Figure 7:
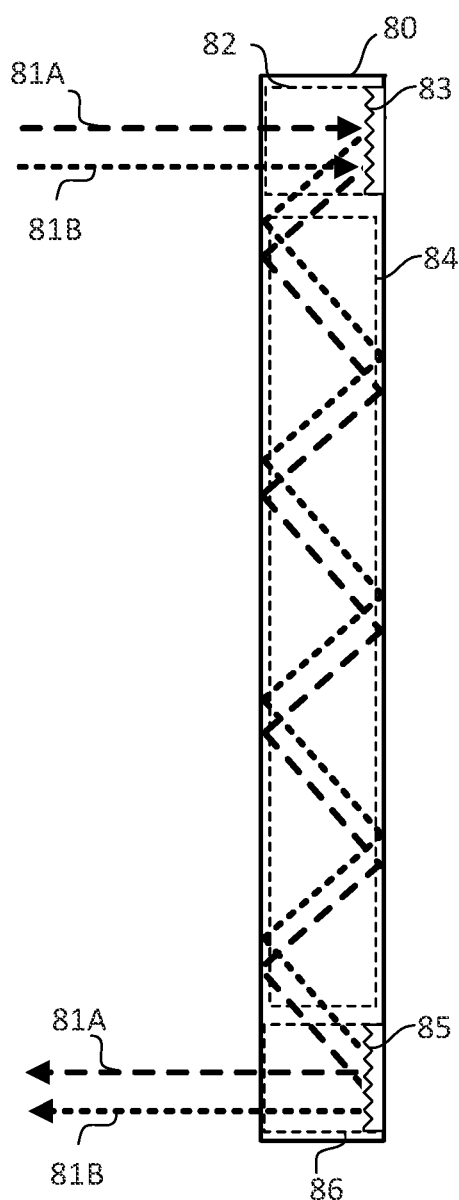
FIG. 7 schematically shows a zoomed side view of a waveguide in accordance with that shown in FIGS. 5 and 6.

FIG. 7 schematically shows a zoomed side view of a waveguide in accordance with that shown in FIGS. 5 and 6. Light rays 81A, 81B correspond to multiple wavelengths/colors and collectively represent an image (e.g., the left or right component of a stereoscopic image). Although light rays representing only two wavelengths/colors are shown for the sake of simplicity, it should be understood that three or more separate wavelengths/colors may be handled by the waveguide in a similar manner. The light rays 81A, 81B enter the waveguide 80 at the incoupling region 82, which includes a reflective or refractive structure 83. The reflective/refractive structure 83 redirects the light rays 81A, 81B to cause them to propagate via total internal reflection (TIR) into the (even order) expansion grating(s) 84. While propagating through the expansion grating(s) via TIR, the image is expanded and turned in a plane perpendicular to the page of FIG. 7, as described above. The light rays 81A, 81B then exit the expansion grating(s) 84 and hit reflective/refractive structure 85 in outcoupling region 86, which redirects the light rays 81A, 81B to cause them to exit the waveguide 80 from outcoupling region 86, from which the rays propagate to the user's eye. Either or both of reflective/refractive structures 83 and 85 can be, for example, a Bragg mirror where the refractive index of the volume is changed in a periodic manner so that it reflects the zero-th diffraction order as a mirror reflection.

EXAMPLES OF CERTAIN EMBODIMENTS

Certain embodiments of the technology introduced herein are summarized in the following numbered examples:

1. A waveguide comprising: a light transmissive substrate having a first surface and a second surface parallel and opposite to the first surface; an optical input port in the substrate, the optical input port including a first reflector disposed to receive light of a plurality of different wavelengths from outside the waveguide and to change a propagation direction of the light so as to cause the light to propagate through the substrate; an optical output port in the substrate, the optical output port including a second reflector to output at least a portion of the light from the waveguide; and a first diffraction grating in the substrate, the first diffraction grating having an even-order diffraction property and being configured to convey at least a first portion of the light from the optical input port to the optical output port while changing a propagation direction of the conveyed first portion of the light within a plane parallel to the first and second surfaces.

2. The waveguide of example 1, wherein the optical input port is disposed to input light that propagates into the input port in a direction perpendicular to the first and second surfaces.

3. The waveguide of example 1 or example 2, wherein the second reflector is disposed to cause the optical output port to output light from the waveguide in a direction perpendicular to the first and second surfaces.

4. The waveguide of any of examples 1 to 3, wherein the optical input port has a substantially circular envelope in the first surface.

5. The waveguide of any of examples 1 to 4, wherein the optical output port has a substantially rectangular envelope in either the first surface or the second surface.

6. The waveguide of any of examples 1 to 5, further comprising a second diffraction grating in the substrate, the first diffraction grating having an even-order diffraction property and being configured to convey at least a second portion of the light from the optical input port to the optical output port while changing a propagation direction of the conveyed second portion of the light within the plane parallel to the first and second surfaces.

7. The waveguide of any of examples 1 to 6, wherein the first diffraction grating and the first portion of the light correspond to a first spatial portion of a field of view provided by the waveguide, and wherein the second diffraction grating and the second portion of the light correspond to a second spatial portion of the field of view.

8. The waveguide of example 1, wherein the first diffraction grating and the second diffraction grating partially overlap along orthogonal axes parallel to the first and second surfaces.

9. The waveguide of any of examples 1 to 8, wherein the optical input port comprises a Bragg mirror to selectively steer light toward the first diffraction grating or the second diffraction grating.

10. The waveguide of any of examples 1 to 9, wherein the optical input port comprises a diffraction structure that has a grating period and a line orientation both tuned to selectively steer light toward the first diffraction grating or the second diffraction grating.

11. The waveguide of any of examples 1 to 10, wherein at least one of the first reflector or the second reflector comprises a volume mirror.

12. The waveguide of any of examples 1 to 11, wherein at least one of the first reflector or the second reflector comprises a Bragg mirror where a refractive index is changed in a periodic manner so as to reflect a zero-th diffraction order as a mirror reflection.

13. A waveguide comprising: a light transmissive substrate having a first surface and a second surface parallel and opposite to the first surface; a substantially circular optical input port in the substrate located at least partially at the first surface, the optical input port including a first reflector disposed to receive light of a plurality of different wavelengths from outside the waveguide in a direction perpendicular to the first and second surfaces and to change a propagation direction of the light so as to cause the light to propagate through the substrate between the first and second surfaces by total internal reflection; a substantially rectangular optical output port in the substrate, the optical output port including a second reflector to output at least a portion of the light from the waveguide in a direction perpendicular to the first and second surfaces; a first diffraction grating in the substrate, the first diffraction grating having an even-order diffraction property and being configured to convey at least a first portion of the light from the optical input port, representing a left portion of a field of view, to the optical output port while changing a propagation direction of the conveyed first portion of the light within a plane parallel to the first and second surfaces; and a second diffraction grating in the substrate, the first diffraction grating having an even-order diffraction property and being configured to convey at least a second portion of the light, representing a right portion of the field of view, from the optical input port to the optical output port while changing a propagation direction of the conveyed second portion of the light within the plane parallel to the first and second surfaces, wherein the first diffraction grating and the first portion of the light correspond to a first spatial portion of a field of view provided by the waveguide, wherein the first diffraction grating and the second diffraction grating partially overlap in a region including a center of the field of view.

14. A near-eye display (NED) device comprising: a display module configured to generate associated left and right images of a stereoscopic image, for display to a user of the NED device to create an augmented reality experience; and a plurality of optically transparent waveguides optically coupled to the display module, a first waveguide of the plurality of optically transparent waveguides being for a left eye of the user and a second waveguide of the plurality of optically transparent waveguides being for a right eye of the user, each of the first and second waveguides separately including a light transmissive substrate having a first surface and a second surface parallel and opposite to the first surface; an optical input port in the substrate located at least partially at the first surface, the optical input port including a first reflector disposed to receive light of a plurality of different wavelengths from outside the waveguide and to change a propagation direction of the light so as to cause the light to propagate within the substrate between the first and second surfaces by total internal reflection; an optical output port in the substrate, the optical output port including a second reflector to output at least a portion of the light from the waveguide; and a first diffraction grating in the substrate, the first diffraction grating having an even-order diffraction property and being configured to convey at least a first portion of the light from the optical input port to the optical output port while changing a propagation direction of the conveyed first portion of the light within a plane parallel to the first and second surfaces.

15. The NED device of example 14, wherein the optical input port is disposed to input light that propagates into the input port in a direction perpendicular to the first and second surfaces.

16. The NED device of example 14 or example 15, wherein the second reflector is disposed to cause the optical output port to output light from the waveguide in a direction perpendicular to the first and second surfaces.

17. The NED device of any of examples 14 to 16, wherein the optical input port has a substantially circular envelope in the first surface, and the optical output port has a substantially rectangular envelope in either the first surface or the second surface.

18. The NED device of any of examples 14 to 17, further comprising a second diffraction grating in the substrate, the first diffraction grating having an even-order diffraction property and being configured to convey at least a second portion of the light from the optical input port to the optical output port while changing a propagation direction of the conveyed second portion of the light within the plane parallel to the first and second surfaces.

19. The NED device of any of examples 14 to 18, wherein the first diffraction grating and the first portion of the light correspond to a first spatial portion of a field of view provided by the waveguide, and wherein the second diffraction grating and the second portion of the light correspond to a second spatial portion of the field of view.

20. The NED device of any of examples 14 to 19, wherein the first diffraction grating and the second diffraction grating partially overlap along orthogonal axes parallel to the first and second surfaces.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A waveguide comprising:
a light transmissive substrate having a first surface and a second surface parallel and opposite to the first surface;
an optical input port in the substrate, the optical input port including a first reflector disposed to receive light of a plurality of different wavelengths from outside the waveguide and to change a propagation direction of the light so as to cause the light to propagate through the substrate;
an optical output port in the substrate, the optical output port including a second reflector to output at least a portion of the light from the waveguide;
a first diffraction grating in the substrate, the first diffraction grating having an even-order diffraction property to diffract at least a first portion of the light, from the optical input port, an even number of times and being configured to convey at least the first portion of the light from the optical input port to the optical output port while changing a propagation direction of the conveyed first portion of the light within a plane parallel to the first surface and the second surface;
a second diffraction grating in the substrate, the second diffraction grating having an even-order diffraction property to diffract at least a second portion of the light, from the optical input, an even number of times and being configured to convey at least the second portion of the light from the optical input port to the optical output port while changing a propagation direction of the conveyed second portion of the light within the plane parallel to the first surface and the second surface,
wherein the first diffraction grating and the second diffraction grating partially overlap along orthogonal axes parallel to the first surface and the second surface such that a center portion of a field of view propagates the first portion of the light and the second portion of the light in a first direction and a second direction, respectively.

2. The waveguide of claim 1, wherein the optical input port is disposed to input light that propagates into the optical input port in a direction perpendicular to the first surface and the second surface.

3. The waveguide of claim 1, wherein the second reflector is disposed to cause the optical output port to output light from the waveguide in a direction perpendicular to the first surface and the second surface.

4. The waveguide of claim 1, wherein the optical input port has a substantially circular envelope in the first surface.

5. The waveguide of claim 1, wherein the optical output port has a substantially rectangular envelope in either the first surface or the second surface.

6. The waveguide of claim 1, wherein the first diffraction grating and the first portion of the light correspond to a first spatial portion of the field of view provided by the waveguide, and wherein the second diffraction grating and the second portion of the light correspond to a second spatial portion of the field of view.

7. The waveguide of claim 1, wherein the optical input port comprises a Bragg mirror to selectively steer light toward the first diffraction grating or the second diffraction grating.

8. The waveguide of claim 1, wherein the optical input port comprises a diffraction structure that has a grating period and a line orientation both tuned to selectively steer light toward the first diffraction grating or the second diffraction grating.

9. The waveguide of claim 1, wherein at least one of the first reflector or the second reflector comprises a Bragg mirror where a refractive index is changed in a periodic manner so as to reflect a zero-th diffraction order as a mirror reflection.

10. A waveguide comprising:
a light transmissive substrate having a first surface and a second surface parallel and opposite to the first surface;
a substantially circular optical input port in the substrate located at least partially at the first surface, the optical input port including a first reflector disposed to receive light of a plurality of different wavelengths from outside the waveguide in a direction perpendicular to the first surface and the second surface and to change a propagation direction of the light so as to cause the light to propagate through the substrate between the first surface and the second surface by total internal reflection;

a substantially rectangular optical output port in the substrate, the optical output port including a second reflector to output at least a portion of the light from the waveguide in a direction perpendicular to the first surface and the second surface;

a first diffraction grating in the substrate, the first diffraction grating having an even-order diffraction property to diffract at least a first portion of the light, from the optical input, an even number of times and being configured to convey at least the first portion of the light from the optical input port, representing a left portion of a field of view, to the optical output port while changing a propagation direction of the conveyed first portion of the light within a plane parallel to the first surface and the second surface; and a second diffraction grating in the substrate, the second diffraction grating having an even-order diffraction property to diffract at least a second portion of the light, from the optical input port, an even number of times and being configured to convey at least the second portion of the light, representing a right portion of the field of view, from the optical input port to the optical output port while changing a propagation direction of the conveyed second portion of the light within the plane parallel to the first surface and the second surface, wherein the first diffraction grating and the first portion of the light correspond to a first spatial portion of the field of view provided by the waveguide, and wherein the first diffraction grating and the second diffraction grating partially overlap in a region including a center of the field of view.

11. A near-eye display (NED) device comprising:

a display module configured to generate associated left and right images of a stereoscopic image, for display to a user of the NED device to create an augmented reality experience; and a plurality of optically transparent waveguides optically coupled to the display module, a first waveguide of the plurality of optically transparent waveguides being for a left eye of the user and a second waveguide of the plurality of optically transparent waveguides being for a right eye of the user, each of the first and second waveguides separately including a light transmissive substrate having a first surface and a second surface parallel and opposite to the first surface;

an optical input port in the substrate located at least partially at the first surface, the optical input port including a first reflector disposed to receive light of a plurality of different wavelengths from outside the waveguide and to change a propagation direction of the light so as to cause the light to propagate within the substrate between the first surface and the second surface by total internal reflection;

an optical output port in the substrate, the optical output port including a second reflector to output at least a portion of the light from the waveguide;

a first diffraction grating in the substrate, the first diffraction grating having an even-order diffraction property to diffract at least a first portion of the light, from the optical input port, an even number of times and being configured to convey at least the first portion of the light from the optical input port to the optical output port while changing a propagation direction of the conveyed first portion of the light within a plane parallel to the first surface and the second surface;

a second diffraction grating in the substrate, the second diffraction grating having an even-order diffraction property to diffract at least a second portion of the light, from the optical input port, an even number of times and being configured to convey at least the second portion of the light from the optical input port to the optical output port while changing a propagation direction of the conveyed second portion of the light within the plane parallel to the first surface and the second surface, wherein the first diffraction grating and the second diffraction grating partially overlap along orthogonal axes parallel to the first surface and the second surface such that a center portion of a field of view propagates the first portion of the light and the second portion of the light in a first direction and a second direction, respectively.

12. The NED device of claim 11, wherein the optical input port is disposed to input light that propagates into the optical input port in a direction perpendicular to the first surface and the second surface.

13. The NED device of claim 11, wherein the second reflector is disposed to cause the optical output port to output light from the waveguide in a direction perpendicular to the first surface and the second surface.

14. The NED device of claim 11, wherein the optical input port has a substantially circular envelope in the first surface, and the optical output port has a substantially rectangular envelope in either the first surface or the second surface.

15. The NED device of claim 14, wherein the first diffraction grating and the first portion of the light correspond to a first spatial portion of the field of view provided by the waveguide, and wherein the second diffraction grating and the second portion of the light correspond to a second spatial portion of the field of view.

* * * * *